Jan. 7, 1964 S. R. ROCKLIN 3,116,693
THERMOELECTRIC PUMP
Filed May 15, 1961
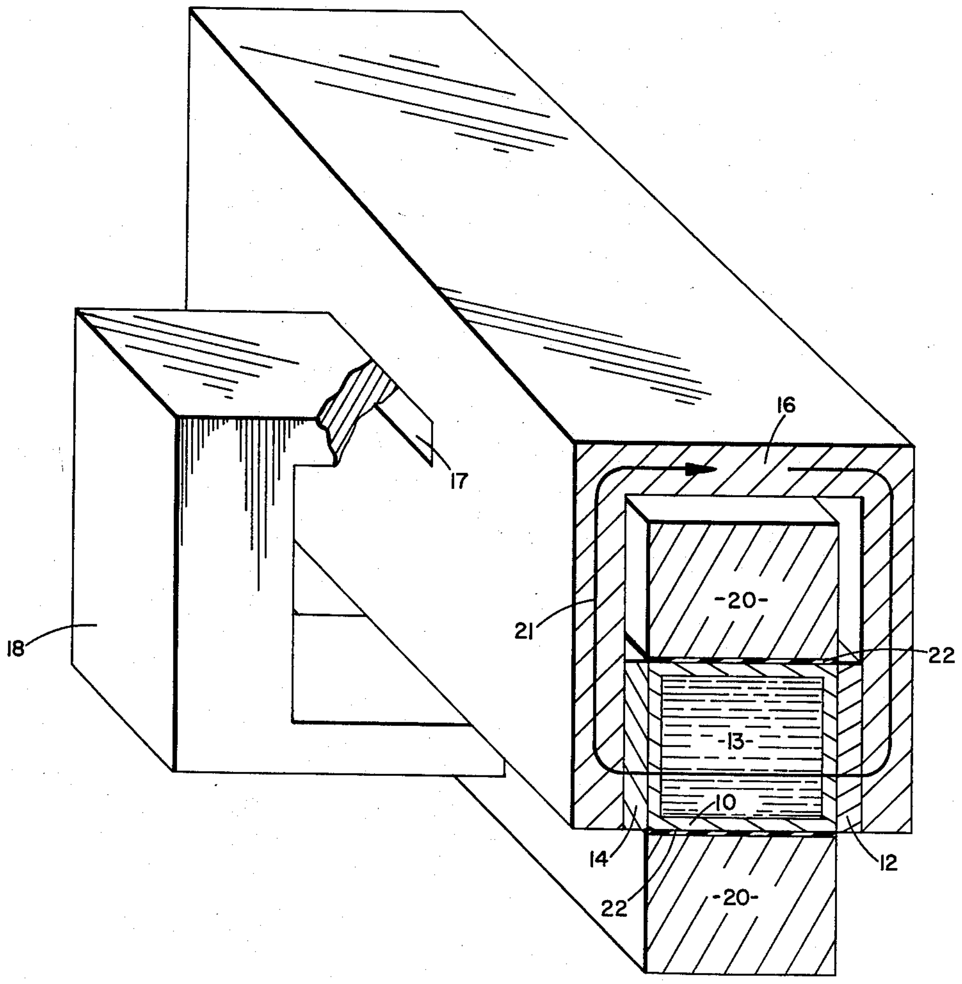
INVENTOR.
SOL R. ROCKLIN
BY
A. Fredrick Hamann
ATTORNEY

United States Patent Office 3,116,693

Patented Jan. 7, 1964

3,116,693

THERMOELECTRIC PUMP

Sol R. Rocklin, Pacific Palisades, Calif., assignor to North American Aviation, Inc.

Filed May 15, 1961, Ser. No. 110,243

2 Claims. (Cl. 103—1)

The present invention relates to pumps and more particularly to thermoelectric pumps for electrically conducting fluids such as liquid metals.

The present invention is particularly adapted for use in systems requiring a self-regulating thermoelectrically energized pump where high reliability and efficiency coupled with light weight are required. One such application is in nuclear reactor power systems in space probes (see Nucleonics, vol. 18, No. 1, January 1960, page 104).

It is therefore an object of the present invention to provide a thermoelectric pump for a liquid conductor which is compact, light in weight, and self regulating.

A further object of the present invention is to provide a thermoelectric pump for a conducting fluid which utilizes a permanent magnetic field.

A still further object of the present invention is to provide a pump where the pumping action is obtained by the generation of an electrical current by means of a temperature gradient existing between the hot conducting fluid and a radiator.

Another object of the present invention is to provide a thermoelectric pump for a conducting fluid in which the pump throat also functions as a thermoelectric contact surface and is equal in length with the thermoelectric elements.

These and other objects of the present invention will be more apparent from the following detailed description and the drawing, hereby made a part hereof.

The FIGURE is a sectioned perspective view of the pump of the present invention.

Referring now to the single drawing, the preferred embodiment of the present invention comprises a metallic throat section or duct 10 preferably of stainless steel, with N-type thermoelectric material 12 thermally and electrically attached to one side of the throat 10 and P-type thermoelectric material 14 thermally and electrically attached to the throat 10 180° from the N material 12. A high conductivity material 16, preferably copper, is connected to and substantially incases elements 12 and 14 to provide an external electrical path between the thermoelectric materials 12 and 14. The material 16, preferably a U-shaped element in which the duct or throat 10 is located, also constitutes a heat exchanger surface which dissipates or radiates heat from the conducting fluid flowing through duct 10. Fins or other extended surfaces (not shown) may be added to the conductor 16 to increase the heat dissipation rate to the surrounding environment. One or more permanent magnets 18 are placed along the side of the copper 16 to supply a magnetic field, thereby avoiding the necessity of increasing the size in order to obtain a self-induced field. Two iron bar members 20 are preferably provided on opposite sides of throat 10 in order to distribute the magnetic flux from the magnet 18 along the length of the pumping throat 10. The iron is thermally and electrically insulated from the throat, e.g. by a mica layer 22. The copper 16 has a window 17 into which the magnet 18 is inserted so that the magnet 18 is in contact with the bar members 20. Alternatively, a portion of the conducting material 16 could be made of iron and contact made through an extension on bar 20. Also, the relative location of the iron 20 and magnet 18 may be interchanged.

The pump utilizes the force produced by the interaction of a direct current passing through the conducting liquid 13 and a magnetic field at right angles to the flow of this current. The required electrical energy is obtained by converting the thermal energy into electrical energy by means of the thermoelectric material 12 and 14. This material may be of the metallic or semiconducting type, i.e. Cr-Const., Pb-Te, and/or other similar materials known in the art.

In operation the junctions of two dissimilar metals or semiconductors are held at different temperatures, since the hot junctions adjacent the throat 10 are near or equal to the conducting fluid temperature, while the cold junctions with the copper 16 are less since the copper acts as a radiator to the surrounding environment. The temperature difference at the junction of the P and N thermoelectric materials results in a voltage which causes a current 21 to flow from the N material, through the wall of the throat 10, the conducting liquid 13, the opposide wall of throat 10, the P material, and return to the N material by means of the external metallic conductor 16. This current 21 interacts with the magnetic field to cause motion of the liquid metal. The direction of this motion is normal to the current-magnetic field plane and manifests itself as a pressure in the liquid metal.

The following table illustrates the characteristics and parameters of the pump of the preferred embodiment.

*TABLE I*

| | |
|---|---|
| Weight (including magnet) | 10 lbs. |
| Length (throat section) | 6.25 in. |
| Height | 1.75 in. |
| Width | 1.75 in. |
| Thermoelectric material | Cr-Const. |
| Thermoelectric thickness | 0.1 in. |
| Throat size | ½ in. x ½ in. |
| Throat material | Stainless steel. |
| Channel wall thickness | 0.01 in. |
| Copper thickness | 0.25 in. |
| Magnetic window area | 1 in. x ¾ in. |
| Thermal insulation between iron and throat | $\frac{1}{32}$ in. mica. |
| Iron cross section | ⅝ in. x $\frac{9}{16}$ in. |
| Pressure in throat | 0.4 p.s.i. |
| Flow rate | 5 g.p.m. |
| $\Delta T$ | ~300° F. |
| Magnetic flux intensity | ~8K l./in.$^2$. |

The thermoelectric elements 12 and 14 are bonded to both the copper 16 and the throat 10 with a bonding agent of 72% Ag, 27½% Cu, ½% Ni. For thermoelectric materials other than the Cr-Const. of the preferred embodiment, other bonding agents known in the art would be utilized.

Although a particular embodiment of the present invention has been described, various modifications will be apparent to those skilled in the art. Therefore, the present invention is not limited to the specific embodiments disclosed but only by the appended claims.

I claim:

1. A thermoelectric pump comprising:

(*a*) an electrically conductive duct means for passing a high temperature electrically conducting fluid, (*b*) respective ones of at least one pair of N-type and P-type thermoelectric elements thermally and electrically connected to associated opposite sides of said duct, (*c*) a metal U-shaped conductor thermally and electrically connected to said elements providing an external electrical path between the cold junctions of said elements and further providing a heat radiation surface along said external path, (*d*) respective ones of said elements engaging the inner surface of and substantially increased by an associated leg of said U-shaped conductor, (*e*) the conducting fluid and said conductive duct providing an internal electrical current path between the hot junctions of said elements, and (*f*) magnet means setting up a magnetic field across said duct substantially normal to said internal electrical path, (*g*) the high temperature fluid and said U-shaped conductor providing a temperature gradient across said N-type and P-type thermoelectric elements so that an electrical current generated by said elements flows in said internal current path normal to said magnetic field and imparts a pumping force in the conducting fluid to move the fluid through said duct normal to the current-magnetic field plane.

2. A thermoelectric pump for pumping a high temperature electrically conducting fluid comprising:

(*a*) an electrically conductive duct having a generally rectangular cross section, (*b*) respective ones of at least one pair of N-type and P-type thermoelectric elements thermally and electrically connected to associated opposite sides of said duct, (*c*) a metal U-shaped electrical conductor thermally and electrically connected to said elements providing an external electrical path between the cold junctions of said elements and further providing a heat radiation surface along said external path, (*d*) respective ones of said elements engaging the inner surface of and substantially incased by an associated leg of said U-shaped conductor, (*e*) the conducting fluid and said conductive duct providing an internal electrical current path between the hot junctions of said elements, (*f*) a channel developed by said U-shaped conductor along one adjacent side of said duct, (*f*) at least one aperture in said conductor communicating with said channel, (*h*) at least one permanent magnet setting up a magnetic field, (*i*) respective ones of a pair of magnetic field distributing members extending along opposite sides of said duct with one of said flux distributing members extending along said channel, (*j*) said permanent magnet extending through said aperture and contacting said pair of flux distributing members and distributing the magnetic field across said duct substantially normal to said internal current path, and (*k*) thermal and electrical insulator means spacing said pair of flux distributing members apart from said duct, (*l*) the high temperature fluid and said U-shaped conductor providing a temperature gradient across said N-type and P-type thermoelectric elements so that an electrical current generated by said elements flows in said internal current path normal to the magnetic field and imparts a pumping force in the conducting fluid to move the fluid through said duct normal to the current-magnetic field plane.

References Cited in the file of this patent

UNITED STATES PATENTS

| | | |
|---|---|---|
| 2,748,710 | Vandenberg | June 5, 1956 |
| 2,881,594 | Hopkins | Apr. 14, 1959 |
| 2,919,356 | Fry | Dec. 29, 1959 |
| 2,977,050 | Sparrow | Mar. 28, 1961 |

FOREIGN PATENTS

| | | |
|---|---|---|
| 1,201,236 | France | July 6, 1959 |